United States Patent

Fujiwara et al.

Patent Number: 5,765,670
Date of Patent: Jun. 16, 1998

[54] ONE WAY CLUTCH

[75] Inventors: Satoshi Fujiwara; Tomomasa Kubo, both of Kashiwara, Japan

[73] Assignee: Koyo Seiko Co., Ltd., Osaka, Japan

[21] Appl. No.: 769,518

[22] Filed: Dec. 19, 1996

[30] Foreign Application Priority Data

Dec. 26, 1995 [JP] Japan ................... 7-352012

[51] Int. Cl.$^6$ ................... F16D 41/07
[52] U.S. Cl. ................... 192/45.1; 192/41 A; 188/82.8
[58] Field of Search ................... 192/45.1, 41 A; 188/82.8

[56] References Cited

U.S. PATENT DOCUMENTS

| | | | |
|---|---|---|---|
| 2,901,072 | 8/1959 | Maurer | 192/45.1 |
| 3,729,076 | 4/1973 | De Lavalette | 192/45.1 |
| 3,819,019 | 6/1974 | Timtner | 192/41 A |
| 4,089,395 | 5/1978 | Fogelberg | 192/45.1 |
| 4,114,739 | 9/1978 | Colonna | 192/45.1 |
| 4,162,000 | 7/1979 | Zlotek | 192/45.1 |
| 4,546,864 | 10/1985 | Hagen et al. | 192/45.1 |
| 4,766,987 | 8/1988 | Message | 192/45.1 |
| 4,880,093 | 11/1989 | Message . | |
| 5,002,167 | 3/1991 | Kinoshita et al. . | |

FOREIGN PATENT DOCUMENTS

| | | |
|---|---|---|
| 742131 | 2/1933 | France . |
| 1475433 | 4/1969 | Germany . |
| 2204305 | 8/1973 | Germany . |
| 3501610 | 7/1985 | Germany . |
| 3741518 | 6/1989 | Germany . |
| 63-259225 | 10/1988 | Japan . |
| 63-266222 | 11/1988 | Japan . |

*Primary Examiner*—Charles A. Marmor
*Assistant Examiner*—Saúl J. Rodríguez
*Attorney, Agent, or Firm*—Reid & Priest LLP

[57] ABSTRACT

In a one way clutch, a sprag does not always turn around a center of curvature thereof, failing to move smoothly because the sprag contacts an outer ring and an inner ring on the surface. Accordingly, switching from idle rotation to locking of the clutch may cause hopping or the like of the sprag which will pop out of place to be broken. The present invention has an object to provide a one way clutch capable of allowing the stable motion of the sprag if the sprag should hop during pivotal movement and offering an increased freedom of design of a retainer and a ribbon spring.

For achieving the object, a one way clutch comprises an annular space defined between an outer ring and an inner ring, sprags, a retainer and a spring, characterized in that the sprag comprises a cam surface contacting an inner circumferential surface of the outer ring, a cam surface contacting an outer circumferential surface of the inner ring and a protrusion opposing a wall surface of a pocket of the retainer. The latter cam surface and the protrusion are configured such as to have the respective curvature centers positioned at the same center of turning. On the other hand, the cam surface contacting the inner circumferential surface of the outer ring is configured to turn about the curvature center thereof positioned in the vicinity of the curvature center of the cam surface and protrusion.

2 Claims, 3 Drawing Sheets

ONE WAY CLUTCH

BACKGROUND OF THE INVENTION

The present invention relates to a one way clutch comprising a plurality of sprags disposed in an annular space defined between an outer ring and an inner ring, and adapted to allow rotation of the outer ring relative to the inner ring in one direction and to lock the rotation thereof in the opposite direction.

An automatic transmission mechanism for use in automobiles generally employs a one way clutch for transmitting a rotational torque only in one direction. Such a one way clutch comprises, as shown in FIG. 5 for example, an outer ring 11, an inner ring 12, a plurality of engagement members (sprags) 15 disposed at regular pitches in the circumferential direction within an annular space 14 defined between the outer and inner rings, an outer retainer 13a and an inner retainer 13b for retaining the sprags 15, and an annular ribbon spring 16 for biasing the sprags 15 toward a locking side. In this case, the ribbon spring 16 is also formed with insertion holes 16P for receiving and retaining the sprags 15. Another type of one way clutch has a construction wherein the sprags 15 disposed within the annular space 14 defined between the outer and inner rings are retained by only one retainer 13 and biased by the ribbon spring 16, as shown in FIG. 6. In either case, the one way clutches are mostly comprised of the sprags 15, retainer 13 (13a, 13b) and ribbon spring 16. As to such one way clutches, improvements have been made to the ribbon spring so as to restrict unstable motion of the sprag repeating pivotal motion or to reduce friction produced by the pivotal movement of the sprag as much as possible (see Japanese Unexamined Patent Publications No. 63-266222 (1988) and No. 63-259225 (1988).

Since the one way clutch repeats rotation (idle rotation) and locking, it is desirable to configure the sprag so as to pivot (turn) at a regular angle about the center of a curvature of an inner or an outer cam surface thereof. Actually, however, the sprag does not turn about the center of the curvature of the cam surface thereof because the sprag contacts the outer and inner rings on the surface. In the case of quick repetition of idle rotation and locking of the clutch, for example, the sprag fails to move smoothly so that switching from idle rotation to locking of the clutch may cause hopping or the like of the sprag, which will pop far out of place to be damaged. Furthermore, there is restriction on the manner in which the ribbon spring retains the sprags or on the construction of the retainer.

SUMMARY OF THE INVENTION

In view of the foregoing, it is an object of the present invention to provide a one way clutch capable of stabilizing the motion of a sprag even when the hopping of the sprag occurs during the pivotal movement thereof and offering an increased freedom of design of a retainer and a ribbon spring.

In accordance with a mode (1) of the invention for achieving the above object, a one way clutch comprises an annular space defined between an outer ring and an inner ring, sprags, a retainer for retaining the sprags in pockets formed therein at regular intervals along a circumferential direction thereof, and a spring for biasing the sprags in a locking direction, which sprags, retainer and spring are disposed in the annular space, the one way clutch characterized in that the sprag is formed with a cam surface contacting an inner circumferential surface of the outer ring, a cam surface contacting an outer circumferential surface of the inner ring and a protrusion opposing a wall surface of the pocket of the retainer across a certain gap defined therebetween, formed concentrically with the wall surface and having a smaller curvature radius than that of the cam surface contacting the outer circumferential surface of the inner ring or of the cam surface contacting the inner circumferential surface of the outer ring, that the cam surface contacting the outer circumferential surface of the inner ring or the inner circumferential surface of the outer ring and the protrusion opposing the wall surface of the pocket of the retainer across a certain gap therebetween are so configured as to have the centers of the respective curvatures thereof positioned at the same first center about which the cam surface and protrusion turn as associated with the pivotal movement of the sprag, and that the cam surface opposite to the cam surface having the curvature center at the first center is configured to turn about the center of the curvature thereof positioned in the vicinity of the aforesaid first center.

In accordance with another mode (2) of the invention, a one way clutch comprises an annular space defined between an outer ring and an inner ring, sprags, a retainer for retaining the sprags in pockets formed therein at regular intervals along a circumferential direction thereof, and a spring for biasing the sprags in a locking direction, which sprags, retainer and spring are disposed in the annular space, the one way clutch characterized in that the sprag is formed with a cam surface contacting an inner circumferential surface of the outer ring, a cam surface contacting an outer circumferential surface of the inner ring and protrusions opposing fore and rear wall surfaces of the pocket of the retainer across a certain gap defined therebetween, respectively, being formed concentrically with the respective wall surfaces and having a smaller curvature radius than that of the cam surface contacting the outer circumferential surface of the inner ring or the inner circumferential surface of the outer ring, that the cam surface contacting the outer circumferential surface of the inner ring or the inner circumferential surface of the outer ring and the protrusions respectively opposing the fore and rear wall surfaces of the pocket of the retainer across a certain gap therebetween , respectively , are so configured as to have the centers of the respective curvatures thereof positioned at the same second center about which the cam surface and protrusions turn as associated with the pivotal movement of the sprag, and that the cam surface opposite to the cam surface having the curvature center at the second center is so configured as to turn about the curvature center thereof positioned in the vicinity of the aforesaid second center.

In accordance with still another mode (3) of the invention, a one way clutch embodied in the mode (1) or (2) is characterized in that the sprag further includes a projection in the vicinity of the cam surface on the outer or inner side on the sprag for bumping against the inner circumferential surface of the outer ring or the outer circumferential surface of the inner ring when the sprag idly rotation

DETAILED DESCRIPTION OF THE PREFERRED EMBODIMENTS

Preferred embodiments of the present invention will hereinafter be described in detail with reference to the attached drawings.

Figure 1:
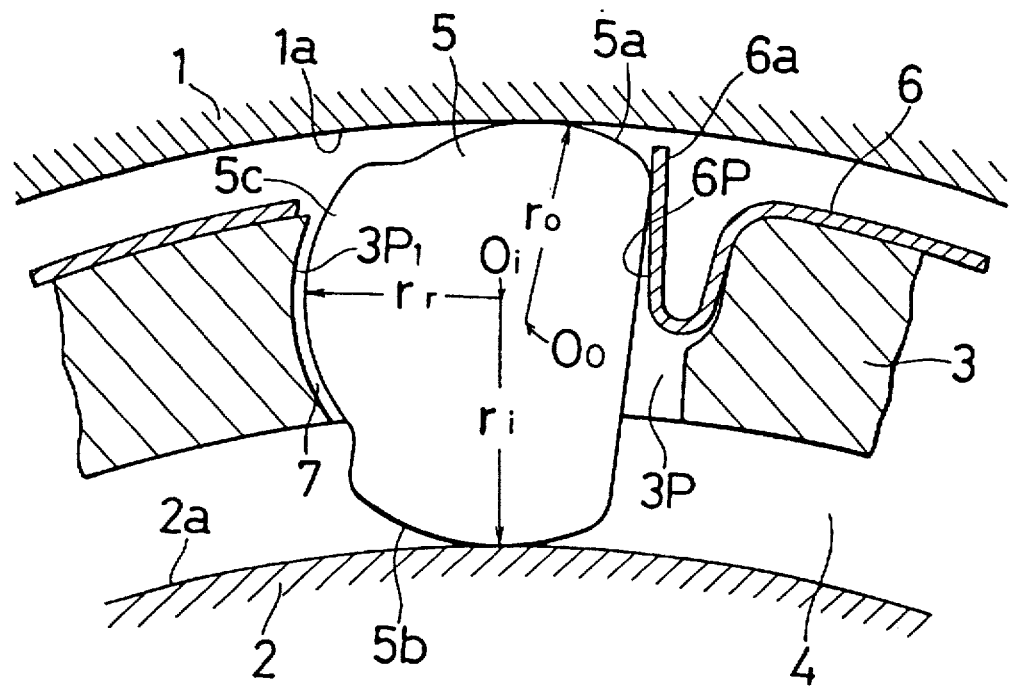
FIG. 1 is a sectional view illustrating a part of a one way clutch according to a first embodiment of the invention.

Referring to FIG. 1, a reference character 1 denotes an outer ring fixed to the inner diameter side of a stator boss of a torque converter, for example. An inner ring indicated at 2 is fixed to, for example, a stationary shaft of the torque converter. Disposed within an annular space 4 defined between the outer ring 1 and the inner ring 2 are a retainer 3 for retaining sprags 5 within pockets 3P formed therein at a regular intervals (pitch) along a circumferential direction thereof, and a spring 6 for biasing the sprags 5 in a locking direction. In this case, the spring 6 is also provided with insertion holes 6P for receiving and retaining the sprags 5. In FIG. 1, the spring 6 is securely attached to the retainer 3.

Figure 2A:
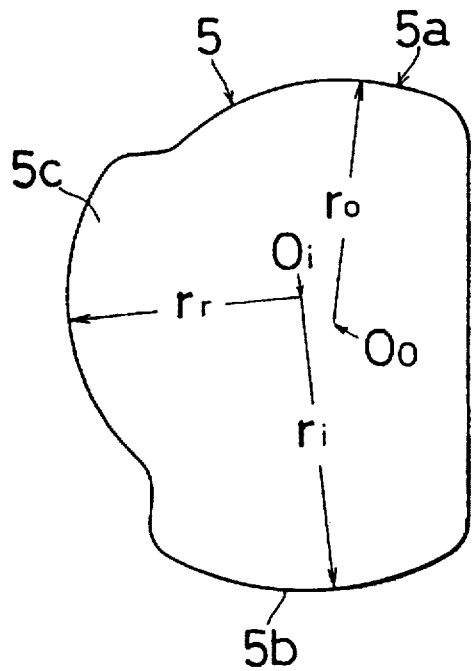
FIG. 2(A) is a side view of a sprag employed by the one way clutch according to the first embodiment of the invention and FIG. 2(B) is a front view of the sprag.
Figure 2B:
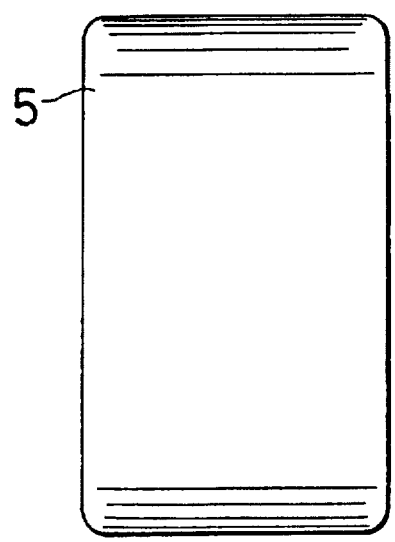

As shown in FIG. 2, the sprag 5 comprises a cam surface 5a contacting an inner circumferential surface 1a of the outer ring 1 during the pivotal movement of the sprag, a cam surface 5b contacting an outer surface 2a of the inner ring 2 during the pivotal movement of the sprag and a protrusion 5c opposing a wall surface $3P_1$ of the pocket 3P of the retainer 3 with a certain gap defined therebetween. The protrusion 5c is concentrically formed with the wall surface $3P_1$ of the pocket 3P of the retainer 3. In this case, the cam surface 5b contacting the outer circumferential surface 2a of the inner ring 2 and the protrusion 5c opposing the wall surface $3P_1$ of the pocket 3P of the retainer 3 across a certain gap therebetween are configured such that a curvature radius $r_r$ is smaller than a curvature radius $r_i$, where "$r_i$" denotes a curvature radius of the cam surface 5b and "$r_r$" denotes a curvature radius of the protrusion 5c, respectively. In this construction, the centers of these curvatures are positioned at the same first center $0_o$ about which the cam surface 5b and protrusion 5c turn as associated with the pivotal movement of the sprag 5. On the other hand, the cam surface 5a contacting the inner circumferential surface 1a of the outer ring 1 is so configured as to have a curvature radius of $r_o$ to turn about the center $0_o$ of the curvature thereof positioned in the vicinity the first center $0_i$.

The spring 6 is disposed along the outer circumferential surface of the retainer 3, biasing the sprag 5 in a direction to lock the sprag 6 by means of a tongue 6a defined on one side of the sprag insertion hole 6P.

In the one way clutch including the sprag 5 of the aforementioned construction, when the outer ring 1 rotates relatively to the inner ring 2, the sprag 5 turns with the outer cam surface 5a rolling on the inner circumferential surface 1a of the outer ring 1 about the center $0_o$ and with the inner cam surface 5b rolling on the outer circumferential surface 2a of the inner ring 2 about the center $0_i$. If the one way clutch frequently repeats idle rotation and locking, the clutch does not suffer from the hopping or unstable movement of the sprag 5 upon switching from idle rotation to locking.

Incidentally, a similar effect to the above may be attained by a construction wherein the curvature radius $r_r$ of the protrusion 5c is smaller than the curvature radius $r_o$ of the cam surface 5a such that the centers of these curvatures are positioned at the same first center $0_i$ about which the protrusion 5c and cam surface 5a turn as associated with the pivotal movement of the sprag 5 while the other cam surface 5b turns about the curvature center thereof, which center is positioned in the vicinity of the first center $0_i$.

Figure 3:
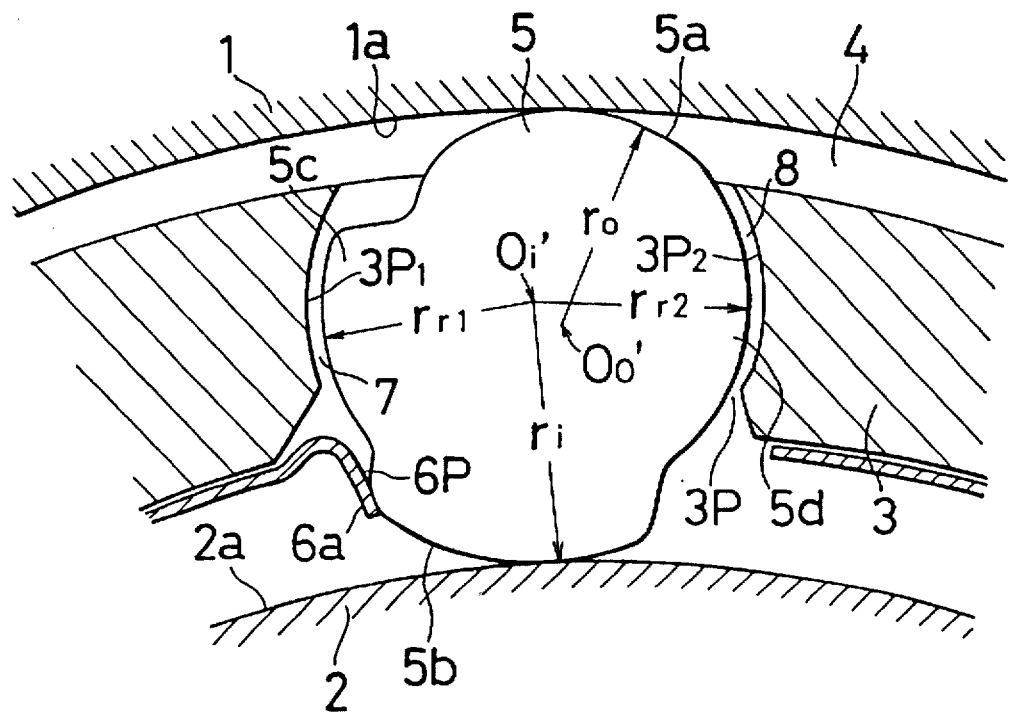
FIG. 3 is a sectional view illustrating a part of a one way clutch according to a second embodiment of the invention.

FIG. 3 is a sectional view illustrating a part of a one way clutch according to a second embodiment of the invention. In this embodiment, a sprag 5 comprises a cam surface 5a contacting an inner circumferential surface 1a of an outer ring 1, a cam surface 5b contacting an outer circumferential surface 2a of an inner ring 2, protrusions 5c and 5d opposing wall surfaces $3P_1$ and $3P_2$ of a pocket 3P of a retainer 3 across a certain gap defined therebetween, respectively, the wall surfaces $3P_1$ and $3P_2$ disposed on the fore and rear sides of the pocket 3P of the retainer 3. The respective pairs of the protrusion 5c and wall surface $3P_1$, and the protrusion 5d and wall surface $3P_2$ are formed concentrically. In this case, a construction is made such that curvature radii $r_{r1}$ and $r_{r2}$ are smaller than a curvature radius $r_i$ where "$r_i$" denotes a curvature radius of the cam surface 5b "$r_{r1}$" and "$r_{r2}$" denote curvature radii of the protrusions 5c and 5d, respectively. In this construction, the centers of these curvatures are positioned at the same second center $0_i'$ about which the curvatures turn as associated with the pivotal movement of the sprag 5. On the other hand, the cam surface 5a contacting the inner circumferential surface 1a of the outer ring 1 has a curvature radius of $r_o$. The curvature has a center $0_o'$ positioned near the second center $0_i'$ about which center $0_o'$ the cam surface 5a turns.

In the embodiment shown in FIG. 3, the spring 6 is disposed along the inner circumferential surface of the retainer 3, biasing the sprag 5 in a direction to lock the sprag 5 by means of a tongue 6a disposed on one side of a sprag insertion hole 6P of the spring 6.

In the one way clutch including the sprag 5 of the aforementioned construction, the rotation of the outer ring 1 relative to the inner ring 2 causes the sprag 5 to turn with the cam surface 5a thereof on the outer side rolling about the center $0_o'$ on the inner circumferential surface 1a of the outer ring 1 and the cam surface 5b on the inner side rolling about the center $0_o'$ on the outer circumferential surface 2a of the inner ring 2. If the one way clutch frequently repeats rotation and locking, the clutch does not suffer from the hopping or unstable movement of the sprag 5 upon switching from idle rotation to locking.

Incidentally, a similar effect to the above may be attained by a construction wherein the curvature radii $r_{r1}$ and $r_{r2}$ of the protrusions 5c and 5d are smaller than the curvature radius $r_o$ of the cam surface 5a so as to position the centers of these curvatures at the same second center $0_i'$ about which the protrusions and the cam surface 5a turn as associated with the pivotal movement of the sprag 5, and wherein the cam surface 5b has a curvature center positioned near the second center $0_i'$ about which center the cam surface turns.

Figure 4:
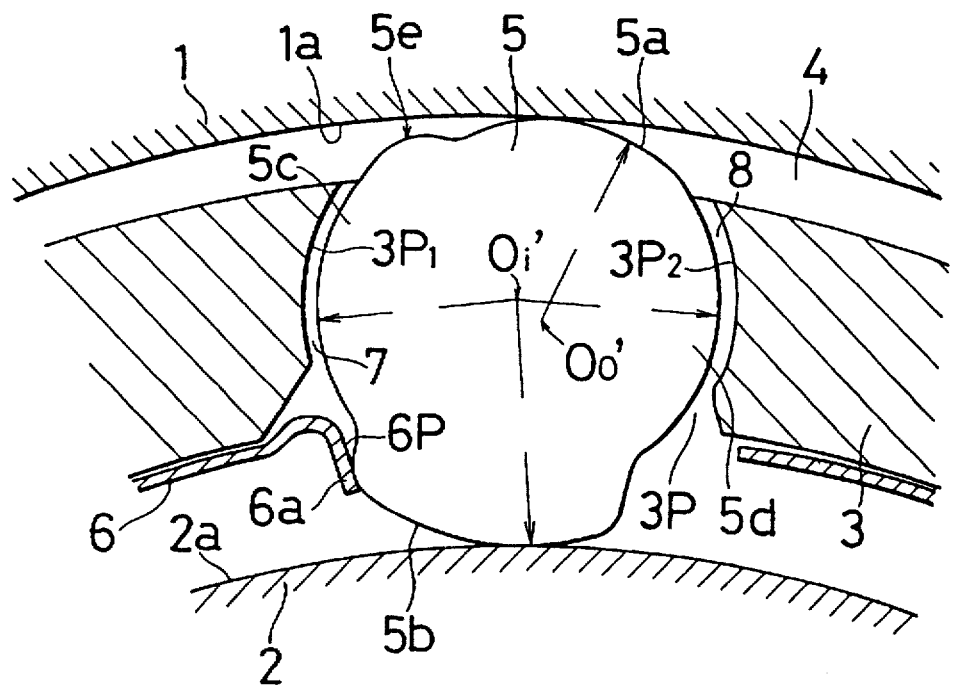
FIG. 4 is a sectional view illustrating a part of a one way clutch according to a third embodiment of the invention.
Figure 5:
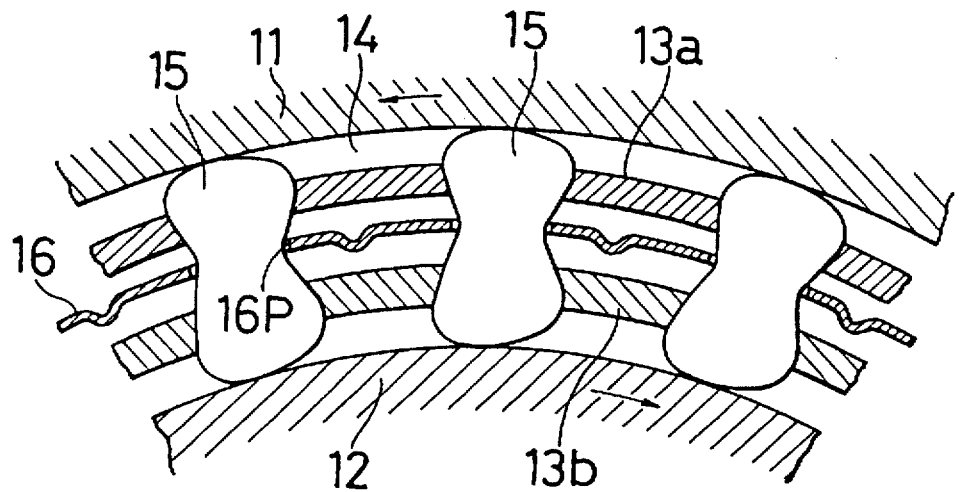
FIG. 5 is a sectional view illustrating a part of a prior-art one way clutch wherein two retainers are employed.
Figure 6:
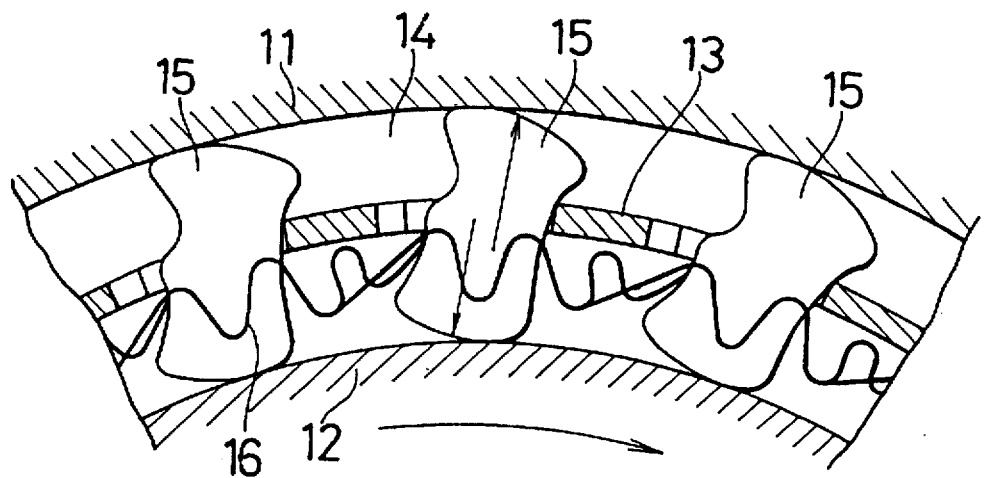
FIG. 6 is a sectional view illustrating a part of another one way clutch of prior art wherein one retainer is employed.

FIG. 4 is a sectional view illustrating a part of a one way clutch according to a third embodiment of the invention. The embodiment essentially has a similar construction to the second embodiment of FIG. 3, except for that the protrusion 5c further has a projection 5e on the outer side for bumping against the inner circumferential surface 1a of the outer ring 1 when the sprag idly turns, the protrusion 5c opposing the fore wall surface $3P_1$ of the pocket 3P of the retainer 3 for retaining the sprag 5 with a certain gap defined therebetween. The projection 5e serves to prevent over-turn of the sprag 5 when the sprag idly turns to hop during the repetition of pivoting and locking. Incidentally, the projection 5e may be provided on the inner side on the sprag. Further, the projection 5e may also be provided on the outer or inner side on the sprag 5 of FIGS. 1 or 2.

As described above, the one way clutch of the invention provides the motion of the sprag substantially the same as the theoretical motion, thus allowing the sprag to move in a stable manner during repetition of pivoting and locking. The one way clutch of the invention is further adapted to restrict the movement of the sprag caused to hop by switching from idle rotation to locking of the clutch and thus, the sprag is protected from breakage.

Furthermore, the present invention increases freedom of design of the retainer and spring, providing a less costly one way clutch.

What is claimed is:

1. A one-way clutch comprising:
   a) sprags;
   b) a retainer having pockets for retaining the sprags at regular circumferential intervals;
   c) a spring for biasing the sprags in a locking direction; and
   d) an annular space defined between an outer ring and an inner ring, the annular space containing the sprags, retainer and spring;
   wherein:
   A) at least one of the sprags includes:
      1) a first cam surface contacting an inner circumferential surface of the outer ring;
      2) a second cam surface contacting an outer circumferential surface of the inner ring;
      3) a protrusion opposing a wall surface of the retainer pocket across a gap, the protrusion being formed concentrically with the wall surface and having a radius of curvature that is smaller than a radius of curvature of a selected cam surface from among the first and second cam surfaces; and
      4) a projection for bumping against one of the circumferential surfaces when the sprag idly turns;
   B) the protrusion and the selected cam surface have a common center of curvature positioned at a point about which the protrusion and selected cam surface turn with pivotal movement of the sprag; and
   C) a non-selected cam surface, from among the first and second cam surfaces, is configured to turn about a center of curvature near the point.

2. A one-way clutch comprising:
   a) sprags;
   b) a retainer having pockets for retaining the sprags at regular circumferential intervals;
   c) a spring for biasing the sprags in a locking direction; and
   d) an annular space defined between an outer ring and an inner ring, the annular space containing the sprags, retainer and spring;
   wherein:
   A) at least one of the sprags includes:
      1) a first cam surface contacting an inner circumferential surface of the outer ring;
      2) a second cam surface contacting an outer circumferential surface of the inner ring;
      3) protrusions opposing respective wall surfaces of the retainer pocket across respective gaps, the protrusions being formed concentrically with the respective wall surfaces and having radii of curvature that are smaller than a radius of curvature of a selected cam surface from among the first and second cam surfaces; and
      4) a projection for bumping against one of the circumferential surfaces when the sprag idly turns;
   B) the protrusions and the selected cam surface have a common center of curvature positioned at a point about which the protrusions and selected cam surface turn with pivotal movement of the sprag; and
   C) a non-selected cam surface, from among the first and second cam surfaces, is configured to turn about a center of curvature near the point.

* * * * *